United States Patent
Wainfan et al.

[11] Patent Number: 6,138,950
[45] Date of Patent: Oct. 31, 2000

[54] AIRCRAFT ENGINE AIR INTAKE SYSTEM

[75] Inventors: Barnaby Sam Wainfan, Long Beach; Yu Ping Liu, Rolling Hills; Daniel R. Rihn, Long Beach; Douglas William Leggett, Los Angeles; Martin James Georges, Corona; Jeffry Scott Philhower, Segundo; Douglas Ellwood Shultz, Brea; Charles Boccados, Long Beach, all of Calif.

[73] Assignee: Northrop Grumman Corporation, Los Angeles, Calif.

[21] Appl. No.: 09/167,209

[22] Filed: Oct. 6, 1998

[51] Int. Cl.[7] .................. B64B 1/24; B64D 27/00; B01D 39/00

[52] U.S. Cl. ............................... 244/53 B; 55/306

[58] Field of Search ................ 244/53 B, 53 R, 244/121, 1 R, 55, 207, 209; 60/39.092, 39.091; 55/306

[56] References Cited

U.S. PATENT DOCUMENTS

| | | | |
|---|---|---|---|
| 2,598,603 | 5/1952 | Richtarsic | 183/51 |
| 2,846,023 | 8/1958 | Millman | 55/306 |
| 2,944,631 | 7/1960 | Kerry et al. | 183/62 |
| 3,121,545 | 2/1964 | Meletiou | 244/53 |
| 3,196,598 | 7/1965 | Olson | 55/306 |
| 3,286,459 | 11/1966 | Ephraim, Jr. | 60/614 |
| 3,426,981 | 2/1969 | Allcock | 244/1 |
| 3,735,587 | 5/1973 | Addie et al. | 60/624 |
| 3,778,983 | 12/1973 | Rygg | 55/306 |
| 3,871,844 | 3/1975 | Calvin, Sr. | 55/306 |
| 4,077,739 | 3/1978 | Heilenbach | 415/121.2 |
| 4,123,241 | 10/1978 | Maden | 55/442 |
| 4,149,689 | 4/1979 | McDonald | 244/53 B |
| 4,738,416 | 4/1988 | Birbragher | 244/207 |
| 4,928,480 | 5/1990 | Oliver et al. | 60/39.092 |
| 5,106,397 | 4/1992 | Jaroszczyk et al. | 55/270 |
| 5,366,177 | 11/1994 | DeCoux | 244/209 |
| 5,411,224 | 5/1995 | Dearman et al. | 244/53 B |
| 5,522,566 | 6/1996 | Hardy et al. | 244/53 B |
| 5,590,854 | 1/1997 | Shatz | 244/209 |
| 5,591,511 | 1/1997 | Yasui | 244/207 |
| 5,721,402 | 2/1998 | Parente | 244/207 |
| 5,772,156 | 6/1998 | Parikh et al. | 244/209 |
| 5,779,169 | 7/1998 | Sloan | 244/12.3 |

Primary Examiner—Peter M. Poon
Assistant Examiner—Fredrick T. French, III
Attorney, Agent, or Firm—Terry J. Anderson; Karl J. Hoch, Jr.

[57] ABSTRACT

In accordance with the present invention, there is provided an aircraft engine air intake cover for use with an air intake which is characterized by an air velocity profile therewithin. The air intake cover is provided with an air induction plate which disposed across at least a portion of the air intake. The air intake cover is further provided with a multitude of air induction ducts. The induction ducts are disposed about and extend through the air induction plate. Each induction duct has a duct inlet, a duct outlet and a duct body interposed between the duct inlet and the duct outlet. The duct inlets each respectively define an effective inlet diameter. The duct bodies each respectively define a duct body length which is greater than the associated effective duct inlet diameter. The duct outlets each respectively define an effective outlet diameter greater than the effective inlet diameter for increasing the cohesiveness of the air velocity profile within the air intake.

32 Claims, 5 Drawing Sheets

AIRCRAFT ENGINE AIR INTAKE SYSTEM

FIELD OF THE INVENTION

The present invention relates generally to aircraft engines, and more particularly to an air intake having an air induction plate with a multitude of air induction ducts extending therethrough.

BACKGROUND OF THE INVENTION

Protective covers or guards for aircraft engines are known in the art. Such covers are used to guard the engines from foreign debris and are located forward of the engine at the air intake. The introduction of such covers, however, inherently restricts the airflow into the associated air intake. Such restricted intake airflow may not be consistent with the aircraft engine airflow requirements. With respect to airflow requirements, it is desirable to maximize the total pressure recovery, i.e., the airflow which impinges upon the cover compared to that which is delivered to the engine within. Low pressure recovery negatively impacts the engine efficiency and may even result in engine stall. This is especially problematic where there is a sudden high airflow requirement, such as when the aircraft is performing emergency maneuvers.

Thus, when designing an air intake cover, the cover must have enough structure to perform its debris guarding function while having the least amount of interference with the intake airflow. Examples of prior art covers may take the form of a thin screen or grill of intermeshed wires. In addition to inherently restricting airflow, many of these prior art covers undesirably cause downstream air dispersion or turbulence at the back face of the cover inside of the air intake. Turbulence or a non-cohesive air velocity profile within the intake airflow may significantly reduces air pressure to the engines.

As such, based upon the foregoing, there exists a need in the art for an improved air intake system which guards against foreign debris, has enhanced airflow characteristics, especially in terms of pressure recovery, and has low manufacturing costs in comparison to the prior art.

SUMMARY OF THE INVENTION

In accordance with the preferred embodiment of the present invention, there is provided an aircraft engine air intake cover for use with an air intake which is characterized by an air velocity profile therewithin. The air intake cover is provided with an air induction plate which is disposed across at least a portion of the air intake. The air intake cover is further provided with a multitude of air induction ducts. The induction ducts are disposed about and extend through the air induction plate. Each induction duct has a duct inlet, a duct outlet and a duct body extending between the duct inlet and the duct outlet. The duct inlets each respectively define an effective inlet diameter. The duct bodies each respectively define a duct body length which is at least as great as the associated effective duct inlet diameter. The duct outlets each respectively define an effective outlet diameter which is at least as great as the effective inlet diameter. The induction ducts function to increase the cohesiveness of the air velocity profile within the air intake, and attenuating engine noise, while guarding against engine damage due to foreign debris.

As mentioned above, turbulence within the intake airflow can significantly reduce air pressure, and therefore the overall pressure recovery of the intake airflow. In this respect, it is contemplated that the present invention mitigates such turbulence by manipulating the air velocity profile within the air intake. In the presently preferred embodiment of the invention, the effective duct outlet diameters are enlarged in comparison to the associated inlet diameters. This enlargement increases the open area exposed to the air intake and tends to more uniformly introduce intake air into the air intake. Such uniformity or cohesiveness of the air velocity profile tends to mitigate turbulence, and therefore mitigates pressure loss associated with turbulence. The duct inlet may also be chamfered or have rounded edges for increasing the airflow therethrough.

In another embodiment of the present invention, the air intake ducts are arranged in accordance with a localized airflow adjacent the air intake cover. In this respect, the duct bodies are preferably each respectfully defined by a duct longitudinal axis which, to the extent practical, may be co-axial to the localized airflow adjacent the duct inlet for further enhancing airflow therethrough. It should be recognized that the localized airflow may be oriented at any number of angles with respect to the surface of the air induction plate, including substantially parallel to the surface of the air induction plate. In such cases, it is presently contemplated that the duct longitudinal axis may be aligned to be approximately 40° to 50° with respect to the surface of the induction plate, inclined towards the direction of the oncoming localized airflow.

In some aircraft, the air intake may be defined by an aerodynamic surface curvature. In such cases the air induction plate may be contiguously formed with the aerodynamic surface curvature for enhancing the aerodynamic characteristics of the intake and cover. Depending upon the particular application, the air intake may, for example, be integrally formed in an engine nacelle and an aircraft wing, for example.

As noted above, the present invention may be utilized for mitigating engine noise. Experimental tests have shown significant noise reduction where the duct inlet diameters are sized to be about 0.3 inches.

The aircraft engine air intake cover constructed in accordance with the present invention presents numerous advantages not found in related prior art systems. The present intake cover is particularly designed to guard against foreign debris while enhancing the quality of the airflow passing therethrough, in terms of velocity, pressure and turbulence (or lack thereof). In this respect, the particular sizing of the inlet ducts with respect to the outlet ducts tends to manipulate the air velocity profile within the air intake and beneficially direct airflow. Advantageously, the invention further tends to mitigate certain engine noise. In accordance with the present invention those advantages are achieved with minimum pressure loss to the engine input airflow. Experimental tests have shown more than ninety percent (90%) pressure recovery. As such, the present invention represents an advance in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
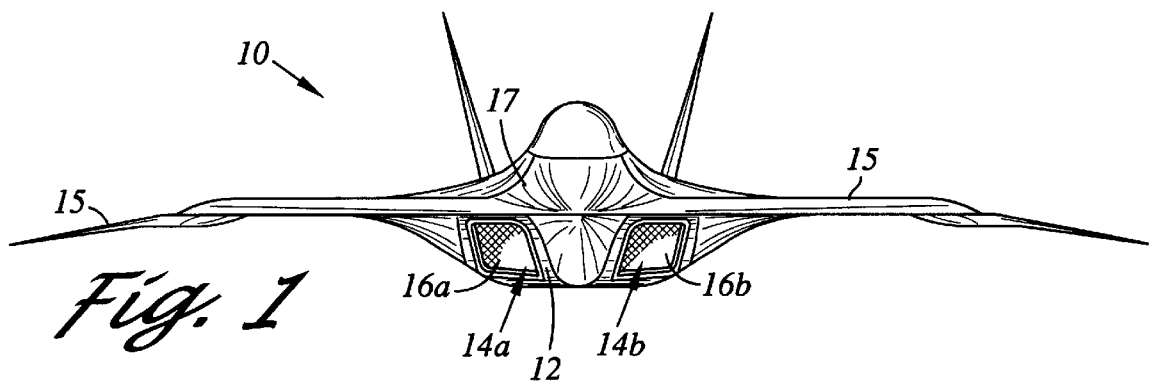
FIG. 1 is a perspective view of air intake cover of the present invention as shown in its operable position in an aircraft.

Referring now to the drawings wherein is depicted for purposes of illustrating a preferred embodiment of the present invention only, and not for purposes of limiting the same, FIGS. 1–13 illustrate an air induction system which is constructed in accordance with the present invention.

Referring now to FIG. 1 there is depicted a representative aircraft 10. The aircraft 10 is provided with an aerodynamic surface curvature 12 formed in part air intake covers 16a and 16b, and having turbine engines disposed therewith. The engines are equipped with air intakes 14a, 14b. The air intakes 14a, 14b are formed within the surface curvature 12 where it draws in exterior airflow. In this respect, the surface curvature 12 partially defines the air intakes 14a, 14b. The air intakes 14a, 14b extend from the surface curvature 12 to the engines and facilitate the delivery of airflow from the exterior of the aircraft 10 to the engines.

Figure 2:
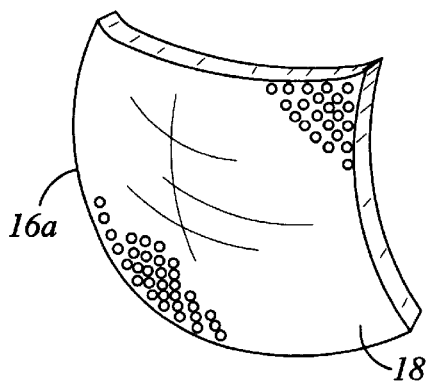
FIG. 2 is a perspective view of the air intake cover of FIG. 1.
Figure 3:
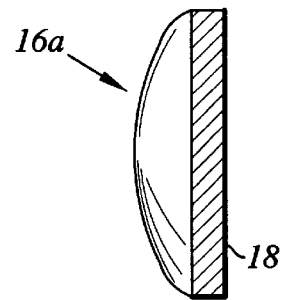
FIG. 3 is a side view of the air intake cover of FIG. 2.

In accordance with the preferred embodiment of the present invention, there is provided an aircraft engine air intake cover 16a for use with an air intake 14. In this respect, there is depicted in FIG. 1 intake covers 16a, 16b for use with the air intakes 14a, 14b. An enlarged perspective view of the intake cover 16a is shown in FIG. 2 and a side view of the same is shown in FIG. 3.

Figure 5:
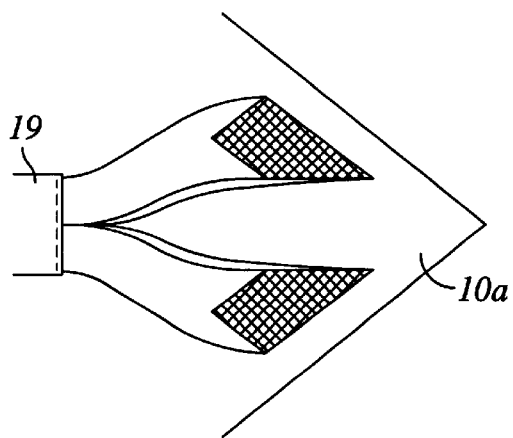
FIG. 5 is a partial top view of dual air intake covers formed in accordance with the present invention.
Figure 6:
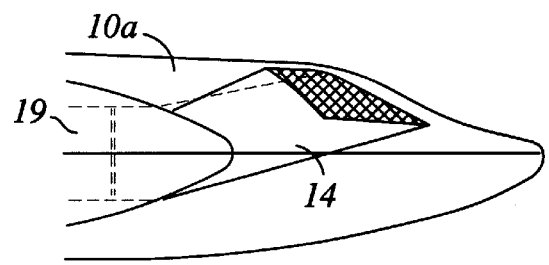
FIG. 6 is a side view of the aircraft surface shown in FIG. 5 with the air intakes and engine depicted in phantom.
Figure 7:
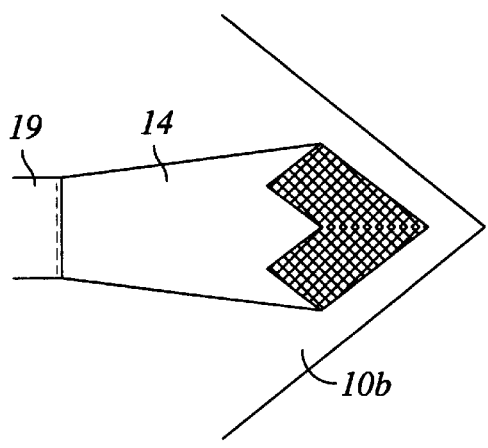
FIG. 7 is a top view of a single air intake cover formed in accordance with the present invention.
Figure 8:
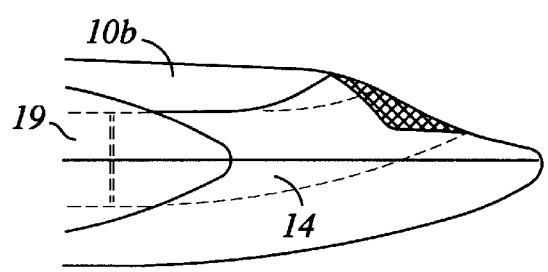
FIG. 8 is a side view of the aircraft surface shown in FIG. 7 with the air intake and engine depicted in phantom.

It is contemplated that the air intakes 14a, 14b may be of any number, size, shape and configuration, including intermediate airflow passageways, which connect with any number of aircraft engines. As can be seen, the exemplarily aircraft 10 is provided with wings 15 which integrally blend with a fuselage 17. While the air intakes 14 are depicted as being primarily integrated with the fuselage 17, the air intakes 14 may be disposed anywhere about the aircraft 10. In this respect, referring now to FIGS. 5 and 6, there is depicted a partial view of another exemplarily aircraft 10a. FIG. 5 depicts a top view of the frontal portion of aircraft 10a and FIG. 6 depicts a side view of the same. As can be seen, there are provided two air intakes 14 which are disposed at the upper side of the aircraft 10a. The air intakes 14 are shown to extend within the aircraft 10a and feed into a common engine 19. Referring now to FIGS. 7 and 8, there is depicted a partial view of yet another exemplarily aircraft 10b which is similar to that shown in FIGS. 5 and 6. Aircraft 10b, however, is provided with a single air intake 14.

Figure 4:
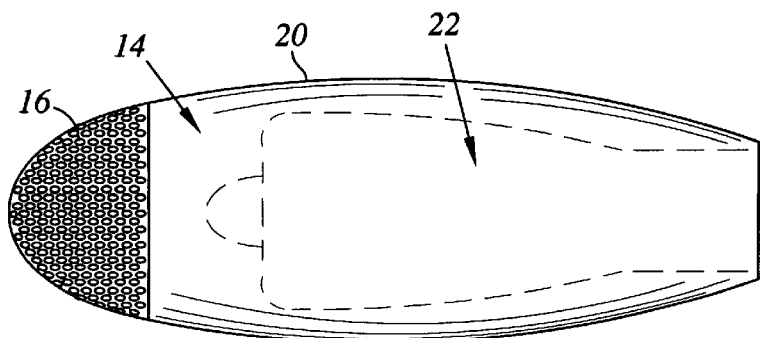
FIG. 4 is a side view of another embodiment of the air intake cover of the present invention as shown with a conventional airliner engine.

Referring now to FIG. 4, there is depicted a conventional aircraft engine configuration with an engine nacelle 20 which houses an aircraft engine 22 (shown in phantom) therewithin. The air intake cover 16 of the present invention is attached to the forward portion of the engine nacelle 20.

As such, it is contemplated that the intake cover 16 of the present invention may be used in cooperation with any number of air intake/engine configurations. Moreover, the intake cover 16 of the present invention may be of variable size and shape. In this respect, intake cover 16 may be relatively flat or formed to have a complex three-dimensional curvature such as that shown in FIGS. 1–3.

When in its operable position, the air intake cover 16 is provided with an air induction plate 18 which disposed across at least a portion of the air intake 14. The air induction plate 18 has an exposed plate front face 24 and a plate back face 26 which encloses the air intake 14. The particular sizing and configuration of the induction ducts 28 is chosen so as to provide a sufficient amount of material at the front face 24 to provide the desired structural strength for the cover 16 to perform its debris guarding function.

One aspect of the present invention is that air induction plate 18, and in particular, the plate front face 24, is contiguously formed with the aerodynamic surface curvature 12 adjacent the air intake 14. As such, the air induction plate 18 forms a portion of the aircraft skin and is integrated with the aerodynamic surface curvature 12. It is contemplated that such a configuration is aerodynamically desirable. This is because the air induction plate 18 provides continuity of the aircraft surface skin across the air intake 14. The particular method of attachment of the air induction plate 18 to the air intake 14 is chosen from those well known to one of ordinary skill in the art.

Figure 9:
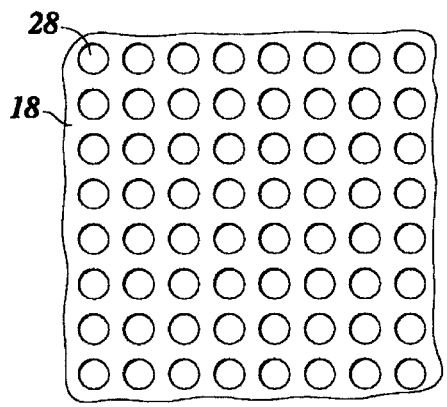
FIGS. 9–11 illustrate air intake covers of the present invention having air induction ducts formed to have different cross-sectional shapes and configurations.
Figure 10:
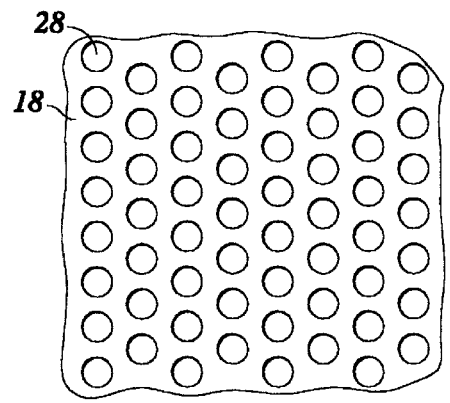
Figure 11:
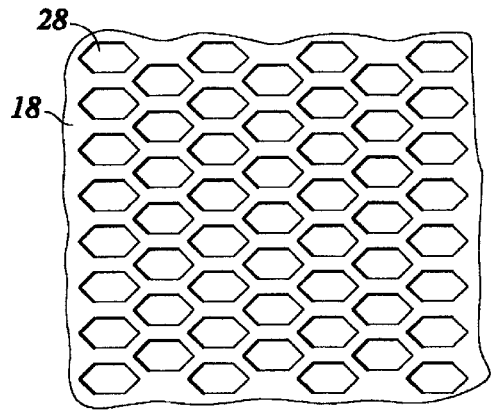

The air intake cover 16 is further provided with a multitude of air induction ducts 28. The induction ducts 28 are disposed about and extend through the air induction plate 18. Referring now to FIGS. 9–11, there are depicted top views of portions of different embodiments of the present invention, with the air induction ducts 28 having a variety of cross-sectional shapes and configurations. The induction ducts 28 may have a circular cross-sectional shape, geometric cross-sectional (e.g., hexagonal, as seen in FIG. 11) and even combinations thereof.

Figure 12:
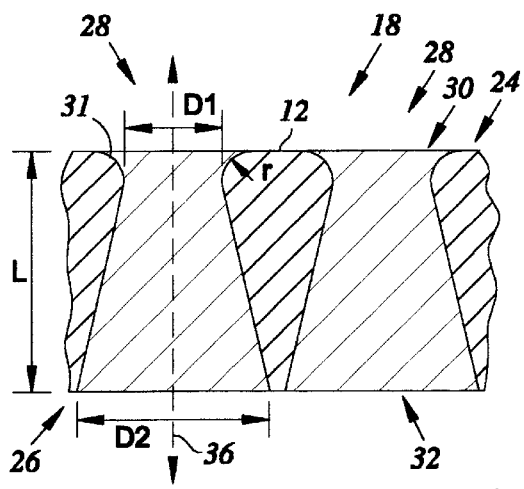
FIG. 12 is an enlarged cross-sectional view of a portion of an embodiment of an air intake cover formed in accordance with the present invention.
Figure 13:
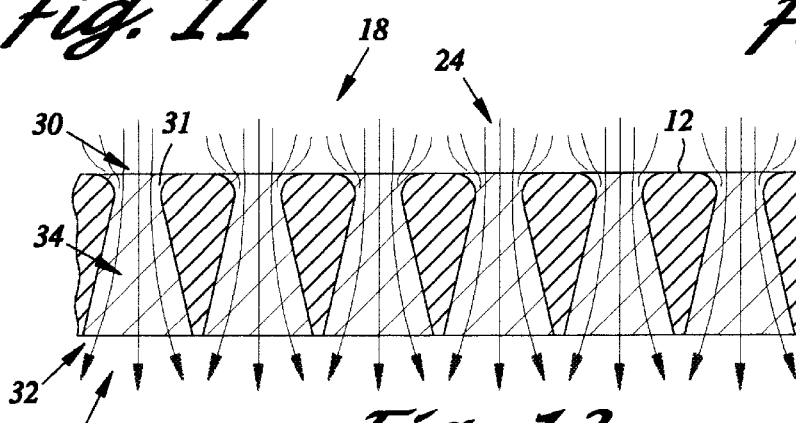
FIG. 13 is a cross-sectional view of a portion of an air intake cover of the present invention showing an exemplary airflow pattern passing therethrough.

Referring now to FIGS. 12 and 13, each induction duct 28 has a duct inlet 30, a duct outlet 32 and a duct body 34 interposed between the duct inlet 30 and the duct outlet 32. The duct inlets 30 each respectively define an inlet cross-sectional area. The inlet cross-sectional area may be used to compute an effective inlet diameter (denoted D1) with the assumption that the area is circular. In the preferred embodiment the effective inlet diameter is less than about 0.3 inches. Further, the duct outlets 32 each respectively define an outlet cross-sectional area. The outlet cross-sectional area may be used to compute an effective outlet diameter (denoted D2) with the assumption that the area is circular. It is preferred that the effective outlet diameter (D2) is at least as great as the effective inlet diameter (D1). In this respect, the induction ducts 28 may be formed to expand as airflow passes from the plate front face 24 to the plate back face 26. The ratio of the effective inlet diameter (D1) to the effective outlet diameter (D2) may be referred to as the duct expansion ratio.

In another embodiment of the present invention, it is contemplated that the engine 22 emanates engine noise through the air intake 14. Such engine noise has an acoustic signature which is characterized by acoustic amplitudes as various frequencies. It is contemplated that the duct inlets 30 may be sized and spaced to mitigate selective portions of the engine noise.

Figure 14:
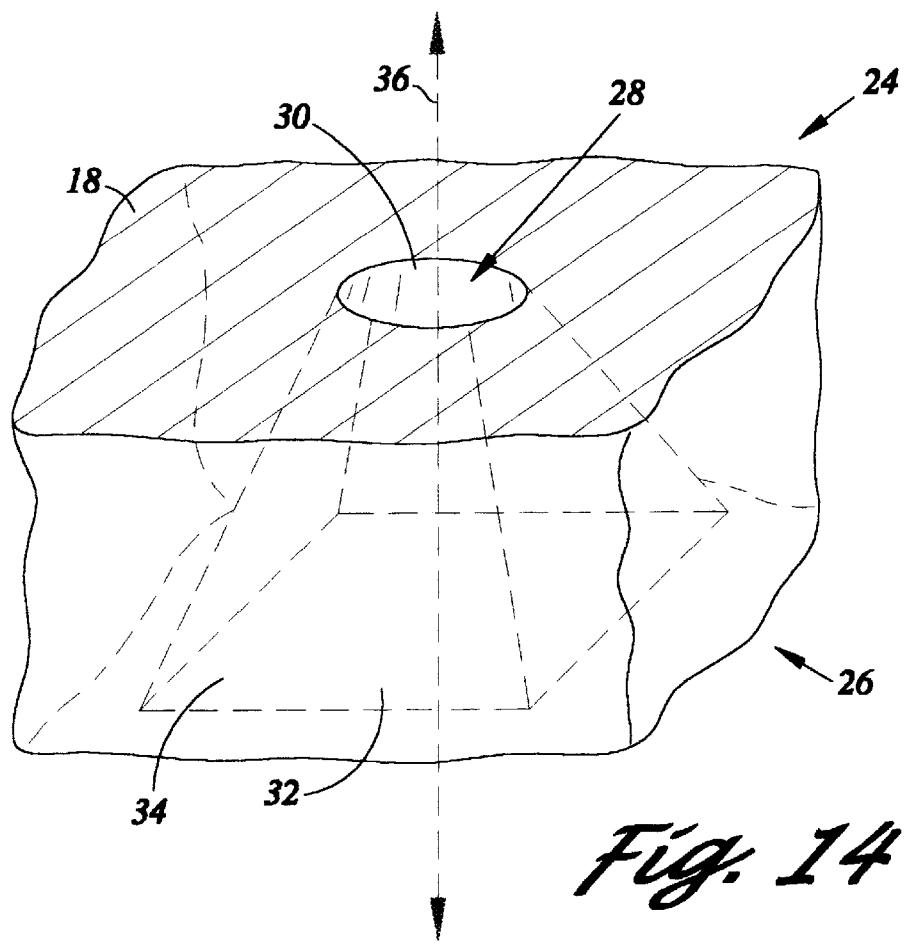
FIG. 14 is an enlarged perspective view of an alternate embodiment of an air induction duct having a progressively increasing cross-sectional area.

Referring now to FIG. 14, there is depicted an enlarged perspective view of an alternate embodiment of an air induction duct 28 having a variable cross-sectional shape (the duct body being shown in phantom). Thus, the cross-sectional shape of the duct inlets 30 may be different than the cross-sectional shape of the duct outlet 32. It is contemplated that the sizing, spacing and configuration of the inlets and outlets 30, 32 may be chosen so as to maximize the open area of the back face 26 of the air induction plate 18.

As mentioned above, turbulence within the intake airflow significantly the reduces air pressure, and therefore the overall pressure recovery of the intake airflow. In this respect, it is contemplated that the present invention mitigates such turbulence by manipulating the air velocity profile within the air intake 14 via the airflow through the induction ducts 28. It is contemplated that airflow passing through such an induction duct 28 expands and in the process is reduced in velocity. As such, the duct expansion ratio impacts the velocity profile of airflow within the air intake. In this regard, the greater the expansion ratio, the greater the uniformity and cohesiveness of the intake air velocity profile. This is because there is a greater amount of open area at the plate back face 26 from which intake airflow is discharged. Such uniformity or cohesiveness of the air velocity profile tends to mitigate turbulence, and therefore tends to avoid the significant loss of pressure recovery associated with turbulence. As such, it is preferable that there be a maximum open area at the back face 26 (i.e., maximum expansion ratio).

The duct bodies 34 each respectively define a duct body length (L) along a duct longitudinal axis 36. Another aspect of the present invention is that the duct body length (L) is at least as long as the effective duct inlet diameter (D1). Preferably, the duct body length (L) is in the range from about the effective duct inlet diameter (D1) to seven (7) times the effective duct inlet diameter (D1). In this respect, the air induction plate 18 is relatively thick and is significantly different from prior art devices which take the form of thin screens, plates or grills. It is contemplated that such a particular sizing of the duct body length (L) (i.e., the thickness of the plate 18) facilitates a laminar channeling of the airflow through the induction duct 28.

Referring again to FIG. 12, in order to facilitate a smooth airflow into the induction ducts 28, the duct inlets 30 may be provided with a chamfered edge 31. Preferably, the duct inlets 30 each respectively have a chamfer radius (r) of about 20 percent of the associated effective inlet diameter (D1).

Figure 15:
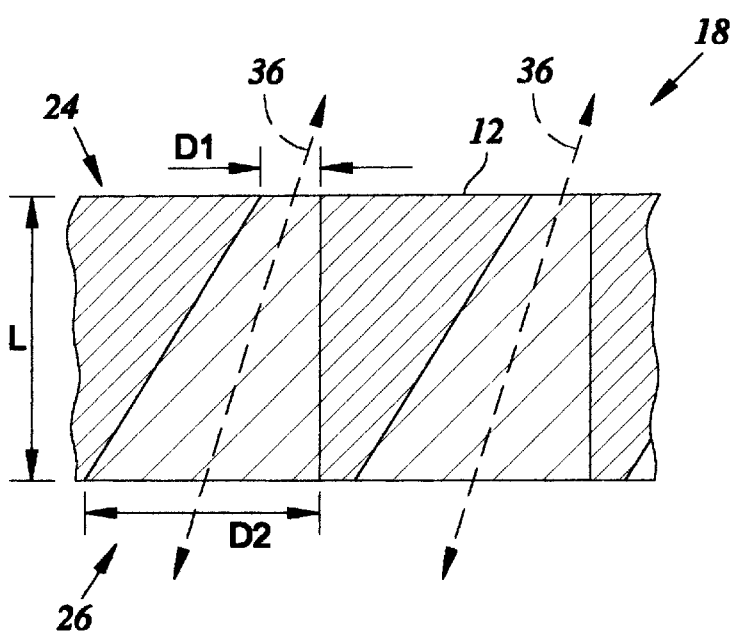
FIG. 15 is an enlarged cross-sectional view of a portion of another embodiment of the present invention depicting the air induction ducts being aligned at an acute angle to the induction plate surface.

Referring now to FIG. 15, there is depicted an alternate embodiment of the present invention wherein the air induction ducts 28 are non-perpendicularly aligned with respect to the front and back faces 24, 26 of the induction plate 18. As mentioned above, each duct body 34 has a duct longitudinal axis 36. Thus, the duct longitudinal axis 36 need not be perpendicular to the front and back faces 24, 26, as shown in FIGS. 12 and 13, but may be at some other angle such as that shown in FIG. 15. As can be seen, the induction ducts 28 may be similarly aligned with respect to each other and in an angular orientation with respect to the front and back faces 24, 26.

Figure 16:
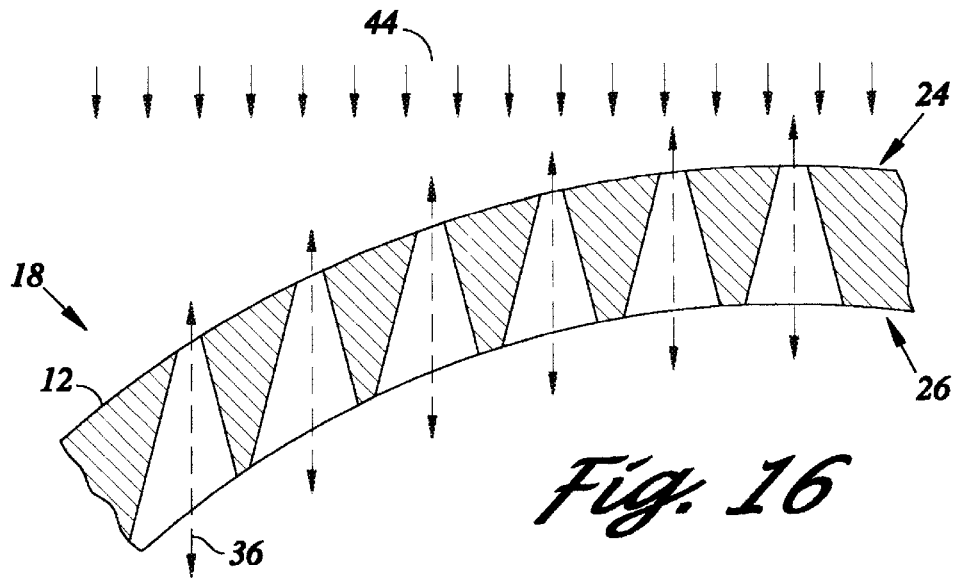
FIG. 16 is an enlarged cross-sectional view of a portion of another embodiment of the present invention depicting induction ducts being disposed at various angles with respect to the induction plate surface and aligned to the incident airflow.

In addition, it is contemplated that the induction ducts 28, specifically the longitudinal axes 36 thereof, may be variably aligned with respect to the front and back faces 24, 26 at differing portions of the induction plate 18. Referring now to FIG. 16, there is depicted an enlarged portion of an exemplary curved induction plate 18. As can be seen, the angular orientations of the various longitudinal axes 36 of the induction ducts 28 are variable with respect to the front and back faces 24, 26. Nonetheless, the induction ducts 28 are formed to be similarly aligned with each other and with incident airflow 44. As such, the longitudinal axes 36 may be formed to be substantially co-axial to the anticipated incident airflow adjacent the duct inlets 30.

Figure 17:
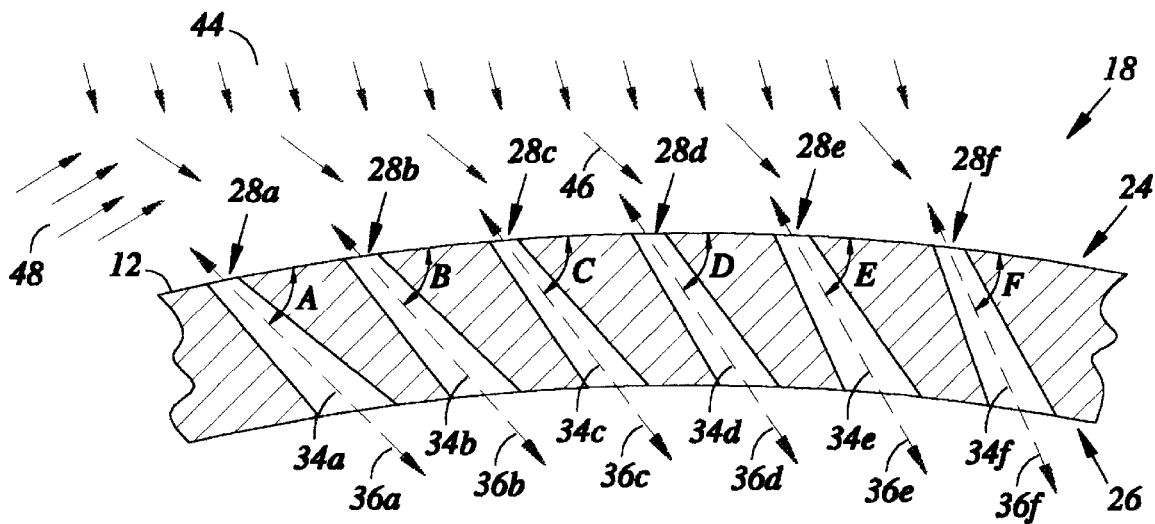
FIG. 17 is an enlarged cross-sectional view of a portion of another embodiment of the present invention depicting the air induction ducts being disposed at various angles with respect to both the inductionplate surface and the incident airflow.

Referring now to FIG. 17, there is depicted a cross-sectional view of another embodiment of the induction cover 16 of the present invention. It is contemplated that when in flight, there is a localized airflow 46 which the aircraft 10, to which the induction cover 16 is affixed, is exposed. The direction of the localized airflow 46 is affected by the combination of the incident airflow 44 and the wall surface airflow 48. The incident airflow 44 is primarily due to the direction of flight and other environmental parameters, such as the prevailing wind direction. As mentioned above, the aircraft 10 is provided with an aerodynamic surface curvature 12.

When in flight, it is contemplated that a wall surface airflow 48 is developed immediately adjacent the aerodynamic surface curvature 12. The direction of the wall surface airflow 48 is dominated by the specific features of the aerodynamic surface curvature 12 and may be substantially co-planar therewith. In this respect, under certain circumstances, the wall surface airflow 48 may be described as a contour airflow adjacent the aerodynamic surface curvature 12 and may be laminar and/or turbulent in nature.

It is contemplated that the localized airflow 46 may be dominated by either of the incident airflow 44 or wall surface airflow 48. Because of the location and configuration of the air intakes 14, the intake cover 16 may be disposed and angularly oriented in a variety of positions about the aircraft 10. As such, it is contemplated that the air intake cover 16 may be aligned at a variety of angular orientations with respect to the localized, incident and wall surface airflows 46, 44, 48. It is further contemplated that the respective direction or alignment of the localized, incident and contour airflows may vary as a function of position with respect to the intake cover 16.

Still referring to FIG. 17, as can be seen, the angular orientations of the various longitudinal axes 36a–f defined by the duct bodies 34a–f of the induction ducts 28a–f are variable with respect to the front and back faces 24, 26. In addition, the angular orientations of the longitudinal axes 36a–f may be variable with respect to one another. It is contemplated that the respective longitudinal axes 36 may be formed to be aligned with or formed to be in a general direction of, any of the localized, incident and wall surface airflows 44, 46, 48. Such construction and alignment of the duct longitudinal axes 36 are contemplated to facilitate increased airflow into the air intake 14 and pressure recovery associated therewith. For example, the longitudinal axis 36f is depicted to be substantially aligned co-axial to the incident airflow 44.

The wall surface airflow 48 is illustratively shown to be substantially aligned with the plane of the front face 24 of the induction plate 18. Should it be desirable to align the duct longitudinal axes 36 with the direction of such a wall surface airflow 48, in practice, it is preferable that the duct longitudinal axes 36 may be aligned at between 40° and 50° with respect to the front faces 24 in the direction of the wall surface airflow 48. This is because a lower angular orientation of the longitudinal axes 36 may result in a loss mechanical strength associated with the induction plate 18 thereat. Additionally, it is contemplated that a lower angular orientation of the longitudinal axes 36 results in a relative lengthening of the induction ducts 28 with an associated, and possibly undesirable increase in surface friction thereat. As such, where the desired airflow angular orientation which the longitudinal axes 36 is desired to be aligned with is less than about 40° to 50°, it is preferable that the longitudinal axes 36 be aligned no less than 40° to 50° with respect to either the front or back faces 24, 26.

Figure 18:
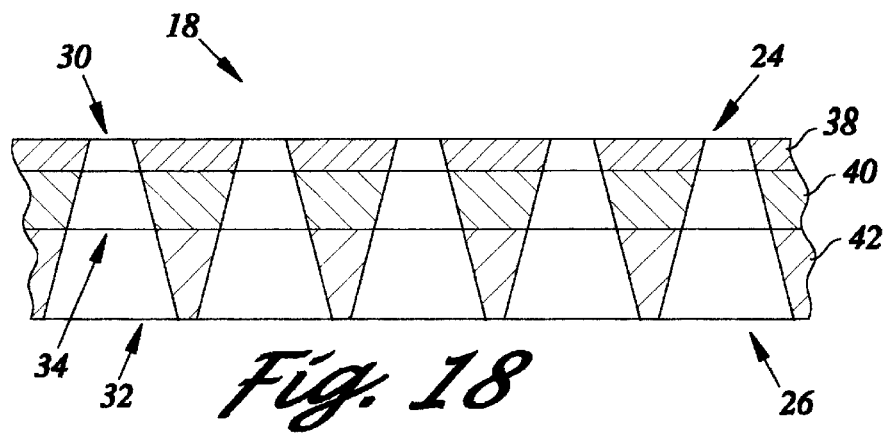
FIG. 18 is an enlarged cross-sectional view of a portion of another embodiment of the present invention depicting a multiple layer induction plate.

Referring now to FIG. 18, the air induction plate 18 may be formed of multiple layers. In this regard, the plate 18 is depicted as being formed of first, second and third layers 38, 40, 42. The layers 38, 40, 42 may be formed of differing materials. In this respect, the air induction plate 18 or layers thereof (such as layers 38, 40, 42) may be formed of a graphite composite material, for example.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. An aircraft engine air intake cover for use with an air intake defined by an aerodynamic surface curvature, the air intake cover comprising:
    an air induction plate disposed across at least a portion of the air intake, the air induction plate being contiguously formed with the aerodynamic surface curvature; and
    a multitude of air induction ducts extending through the air induction plate, each induction duct having a duct inlet, a duct outlet and a duct body interposed between the duct inlet and the duct outlet, the duct inlets each respectively defining an effective duct inlet diameter, the duct bodies each respectively defining a duct effective outlet diameter greater than the effective duct inlet diameter and a duct body length greater than about the associated effective duct inlet diameter.

2. An aircraft engine air intake cover for use with an air intake, wherein engine noise emanates from within the air intake having acoustic amplitudes greater than a threshold noise amplitude, the air intake cover comprising:
    an air induction plate disposed across at least a portion of the air intake; and
    a multitude of air induction ducts extending through the air induction plate, each induction duct having a duct inlet, a duct outlet and a duct body interposed between the duct inlet and the duct outlet, the duct inlets each respectively defining an effective duct inlet diameter less than about the threshold noise amplitude, the duct outlets each respectively defining an effective outlet diameter greater than the inlet diameter.

3. An aircraft engine intake cover for use with an air intake disposable adjacent a localized airflow, the air intake cover comprising:
    an air induction plate disposed across at least a portion of the air intake; and
    a multitude of variably aligned air induction ducts extending through the air induction plate, each induction duct having a duct inlet, a duct outlet and a duct body interposed between the duct inlet and the duct outlet, the duct inlets each respectively defining an effective duct inlet diameter, the duct outlets each respectively defining an effective duct outlet diameter greater than the associated effective duct inlet diameter, the duct bodies each respectively defined by a duct longitudinal axis aligned co-axial to the localized airflow adjacent the duct inlet.

4. An aircraft engine air intake cover for use with an air intake defined by an aerodynamic surface curvature, wherein the air intake is disposable adjacent a localized airflow, the air intake cover comprising:
    an air induction plate disposed across at least a portion of the air intake, the air induction plate being contiguously formed with the aerodynamic surface curvature; and
    a multitude of variably aligned air induction ducts extending through the air induction plate, the induction ducts having a duct inlet, a duct outlet and a duct body interposed between the duct inlet and the duct outlet, the duct bodies each respectively having a duct longitudinal axis aligned co-axial to the localized airflow adjacent the duct inlet.

5. An aircraft engine air intake cover for use with an air intake defined by an aerodynamic surface curvature, the air intake characterized by an air velocity profile therewithin, the air intake cover comprising:
    an air induction plate disposed across at least a portion of the air intake, the air induction plate being contiguously formed with the aerodynamic surface curvature; and
    a multitude of air induction ducts being disposed about and extending through the air induction plate, each induction duct having a duct inlet and a duct outlet, the duct inlets each respectively defining an effective inlet diameter, the duct outlets each respectively defining an effective outlet diameter greater than the effective inlet diameter for increasing the cohesiveness of the air velocity profile within the air intake.

6. An aircraft engine comprising:
    at least one air intake characterized by an air velocity profile therewithin;
    at least one air induction plate disposed across at least a portion of the air intake; and
    a multitude of air induction ducts, the induction ducts being disposed about and extending through the air induction plate, each induction duct having a duct inlet, a duct outlet and a duct body interposed between the duct inlet and duct outlet, the duct inlets each respectively defining an effective inlet diameter, the duct bodies each respectively defining a duct body length which is greater than about the associated effective duct inlet diameter, the duct outlets each respectively defining an effective outlet diameter greater than the effective inlet diameter for increasing the cohesiveness of the air velocity profile within the air intake.

7. The aircraft engine of claim 6 wherein the at least one air intake comprises two air intakes, the at least one air induction plate comprises two air induction plates.

8. The aircraft engine of claim 6 wherein the air intake is integrally formed in an engine nacelle.

9. The aircraft engine of claim 6 wherein the air intake is integrally formed in an aircraft wing.

10. The aircraft engine of claim 6 wherein the air intake is defined by an aerodynamic surface curvature.

11. The aircraft engine of claim 10 wherein the aerodynamic surface curvature is disposed across a portion of an engine nacelle.

12. The aircraft engine of claim 10 wherein the aerodynamic surface curvature is disposed across a portion of an aircraft wing.

13. An aircraft engine intake cover for use with an air intake characterized by an in-flight air velocity profile therewithin, the air intake cover comprising:

an air induction plate disposed across at least a portion of the air intake; and a multitude of air induction ducts, the induction ducts being disposed about and extending through the air induction plate, each induction duct having a duct inlet, a duct outlet and a duct body interposed between the duct inlet and the duct outlet, the duct inlets each respectively defining an effective inlet diameter, the duct bodies each respectively defining a duct body length which is greater than about the associated effective duct inlet diameter, the duct outlets each respectively defining an effective outlet diameter greater than the effective inlet diameter for increasing the cohesiveness of the air velocity profile within the air intake.

14. The air intake cover of claim 1 wherein the air intake is disposable adjacent a localized airflow, each duct body being defined by a duct longitudinal axis which is aligned co-axial to the localized airflow adjacent the duct inlet.

15. The air intake cover of claim 1 wherein the air intake cover is disposable adjacent a localized airflow, each duct body is defined by a duct longitudinal axis which is angularly aligned in a direction towards that localized airflow.

16. The air intake cover of claim 15 further having a front face disposable adjacent the localized airflow, the duct longitudinal axis being aligned at angles between 40° and 50° with respect to the front face towards the localized airflow.

17. The air intake cover of claim 15 wherein the localized airflow is dominated by a wall surface airflow.

18. The air intake cover of claim 15 wherein the localized airflow is dominated by an incident airflow.

19. The air intake cover of claim 1 wherein the air intake being defined by an aerodynamic surface curvature, the air induction plate being contiguously formed with the aerodynamic surface curvature.

20. The air intake cover of claim 1 wherein each duct inlet defining an inlet cross-sectional area, each duct outlet defining an outlet cross-sectional area which is greater than the inlet cross-sectional area.

21. The air intake cover of claim 1 wherein each effective inlet diameter is less than about 0.3 inches.

22. The air intake cover of claim 1 wherein each duct body respectively defines a duct body length which is less than about seven times the associated effective duct inlet diameter.

23. The air intake cover of claim 1 wherein engine noise emanates from within the air intake having acoustic amplitudes greater than a threshold noise amplitude and the effective duct inlet diameters are less than about the threshold noise amplitude.

24. The air intake cover of claim 1 wherein the duct inlets have a circular cross-sectional shape.

25. The air intake cover of claim 1 wherein the duct outlets have a geometric cross-sectional shape.

26. The air intake cover of claim 1 wherein the duct inlets and outlets have different cross-sectional shapes.

27. The air intake cover of claim 1 wherein the duct inlets are chamfered.

28. The air intake cover of claim 27 wherein the duct inlets each respectively have a chamfer radius of about 20 percent of the associated effective inlet diameter.

29. The air intake cover of claim 1 wherein the air induction plate is formed of a graphite composite material.

30. The air intake cover of claim 1 wherein the air induction plate is formed of at least two plate layers.

31. The air intake cover of claim 18 wherein the plate layers are formed of different materials.

32. The air intake cover of claim 1 wherein the air induction plate is dome shaped.

* * * * *